UNITED STATES PATENT OFFICE.

MILLARD F. MORRISON, OF ALEXANDRIA, VIRGINIA, ASSIGNOR OF THREE-FOURTHS TO M. J. WINE, OF WASHINGTON, DISTRICT OF COLUMBIA.

PAINT FOR SHIPS' BOTTOMS.

SPECIFICATION forming part of Letters Patent No. 241,694, dated May 17, 1881.

Application filed October 29, 1880. (Specimens.)

*To all whom it may concern:*

Be it known that I, MILLARD F. MORRISON, a citizen of the United States, residing at Alexandria, in the county of Alexandria and State of Virginia, have invented certain new and useful Improvements in Paint for Ship-Bottoms; and I do hereby declare the following to be a full, clear, and exact description of the invention, using the trade terms or names of the ingredients employed, so as to enable those skilled in the art to which it appertains to make and use the same.

This invention relates to a marine paint used for coating the bottom of vessels; and the objects of the same are to manufacture a paint that will not readily dry on the bottom of the ship while on land or in the water, and that will not rub off easily by the frictional contact with the water; to preserve the wood by entering the pores thereof and effectually prevent the lodgment or gathering of barnacles, worms, and sea-grass on the bottom of the boat or vessel.

My invention consists in a marine paint the vehicle or medium of which is tar-oil and pine-oil.

My invention also consists of a marine paint composed of tar-oil, pine-oil, brown metallic, lamp-black, and copperas, properly mixed, as will be hereinafter more fully set forth.

In the manufacture of the paint for ship-bottoms I have discovered the following proportions to produce about the best results, and, as hereinbefore stated, I shall use the trade-terms in describing the ingredients employed in my improved paint: tar-oil of the ship-chandler, seven pints; pine-oil, one pint; brown metallic, seven pounds; lamp-black, one-fourth ($\frac{1}{4}$) pound; copperas, one-fourth ($\frac{1}{4}$) ounce. The tar-oil of the ship-chandler and brown metallic, pulverized, are mixed together and allowed to remain at rest during the period of about twelve hours, in order to assure the more perfect union or mixture of the materials. The lamp-black and pine-oil are also mixed and allowed to remain standing at rest for about twelve hours, at the expiration of which time the oil, with the lamp-black, is strained and added to the mixture of the tar-oil and brown metallic. At the same time the pulverized copperas is put in the mixture and the whole thoroughly stirred by mechanical means, after which the paint is ready to be put in cans for the trade, and applied to the hulls of vessels with a brush in the ordinary manner.

The employment of the brown metallic—composed of earth about forty parts and iron about sixty parts—gives body to the paint and insures the retention of the color better than other bodies heretofore employed, and it adds to the paint's durability by keeping its strength. This brown metallic, which is a pigment, I am informed is found in the mountain region, near Pittsburg, Pennsylvania, and Cleveland, Ohio.

The lamp-black is to darken the color of the mixture, and also helps to give body to the paint.

The tar-oil of the ship-chandler prevents the rapid drying of the mixture, and, in combination with the pine-oil, enters the pores of the wood, thereby preserving the same from decay, and when used on iron prevents same from rusting.

The copperas, being a poison for barnacles and similar enemies to the bottoms of vessels, and mixed with the other ingredients hereinbefore stated, will effectually prevent the lodgment or collection of the barnacles and worms on the bottom of the vessel.

By practical tests of this paint I have discovered that it does not rapidly dry on the hull of a ship while on the dry-dock or in the water, and does not, as other well-known ship-paints, peel off or crumble, and it prevents the collection or adhesion of barnacles, worms, and sea-grass, and does not rub off easily by frictional contact with the fresh or salt water.

This paint may be used to advantage for other purposes; hence I do not wish to confine its use to marine purposes.

I also claim the right to vary the proportions of the ingredients, as circumstances may occur, without departing from the spirit or results of the invention.

What I claim as my invention, and desire to secure by Letters Patent, is—

1. A marine paint consisting of tar-oil, pine-oil, and brown metallic, substantially as described.

2. A marine paint composed of tar-oil, pine-oil, brown metallic, lamp-black, and copperas, mixed in or about the proportions substantially as described.

In testimony whereof I affix my signature in presence of two witnesses.

MILLARD F. MORRISON.

Witnesses:
J. M. YZNAGA,
JAS. H. CLARK.